(12) United States Patent
Sakai

(10) Patent No.: US 11,696,111 B2
(45) Date of Patent: Jul. 4, 2023

(54) COMMUNICATION APPARATUS, CONTROL METHOD, AND STORAGE MEDIUM

(71) Applicant: CANON KABUSHIKI KAISHA, Tokyo (JP)

(72) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 16/938,455

(22) Filed: Jul. 24, 2020

(65) Prior Publication Data

US 2021/0058764 A1 Feb. 25, 2021

(30) Foreign Application Priority Data

Aug. 23, 2019 (JP) ................................. 2019-152996

(51) Int. Cl.
  *H04W 8/02* (2009.01)
  *H04W 84/04* (2009.01)
  *H04W 84/12* (2009.01)
  *H04W 88/06* (2009.01)

(52) U.S. Cl.
  CPC ............ *H04W 8/02* (2013.01); *H04W 84/042* (2013.01); *H04W 84/12* (2013.01); *H04W 88/06* (2013.01)

(58) Field of Classification Search
  None
  See application file for complete search history.

(56) References Cited

U.S. PATENT DOCUMENTS

| | | | |
|---|---|---|---|
| 7,260,395 B1 * | 8/2007 | Hughes | H04W 4/029 455/434 |
| 2007/0237121 A1 | 10/2007 | Khandelwal | |
| 2008/0175209 A1 * | 7/2008 | Abdel-Kader | H04W 4/029 370/338 |
| 2012/0178429 A1 * | 7/2012 | Camps Mur | H04W 72/1215 455/418 |
| 2014/0141839 A1 * | 5/2014 | Larsson | H04W 8/20 455/558 |
| 2017/0230873 A1 * | 8/2017 | Baek | H04W 36/0011 |

* cited by examiner

*Primary Examiner* — Jinsong Hu
*Assistant Examiner* — Alexander J Yi
(74) *Attorney, Agent, or Firm* — Canon U.S.A., Inc. IP Division

(57) ABSTRACT

A communication apparatus controls, while carrying out wireless communication, the ongoing wireless communication based on country information acquired via other wireless communication.

7 Claims, 6 Drawing Sheets

FIG.4

| MCC | COUNTRY NAME CODE |
|---|---|
| ⋮ | ⋮ |
| 310 | US |
| 311 | US |
| ⋮ | ⋮ |
| 440 | JP |
| 441 | JP |
| ⋮ | ⋮ |

FIG.5

| COUNTRY NAME CODE | USABLE CHANNEL |
|---|---|
| CA, US | W52, W53, W56 |
| JP, UK | W56, W58 |
| ⋮ | ⋮ |

COMMUNICATION APPARATUS, CONTROL METHOD, AND STORAGE MEDIUM

BACKGROUND

Field

The present disclosure relates to control of a communication apparatus performing wireless communication in a network.

Description of the Related Art

In a wireless local area network (WLAN) in compliance with the Institute of Electrical and Electronics Engineers (IEEE) 802.11 standards, communication is carried out using a specific frequency band such as 2.4 gigahertz (GHz) or 5 GHz. In such cases, regulations regarding a frequency channel usable in a frequency band can differ from one country to another, and therefore a frequency channel prohibited in one country may be usable in another country, for example. Further, the regulations regarding a permitted transmission power of radio waves can also differ from one country to another.

United States Patent Publication No. 2007/0237121 describes a communication apparatus that receives country information from a mobile communication network upon being powered up, upon loss of coverage from a WLAN, or upon being handed off from the mobile communication network to a WLAN. Further, United States Patent Publication No. 2007/0237121 discusses that this communication apparatus determines the frequency channel and the transmission power to be used in the WLAN based on the received country information.

The communication apparatus described in United States Patent Publication No. 2007/0237121 acquires the country information via a mobile communication at a timing at which the communication apparatus itself starts communication via the WLAN or a timing at which the mobile communication by the communication apparatus is stopped. And the communication apparatus determines the appropriate frequency channel and transmission power to use in the mobile communication based on the acquired country information. However, the communication apparatus discussed in United States Patent Publication Application No. 2007/0237121 cannot control the frequency channel and the transmission power based on the country information, for example, while communicating with another communication apparatus via the WLAN.

SUMMARY

Various embodiments of the present disclosure provide techniques and mechanisms for improving the convenience of a user by appropriately controlling a wireless communication in a case where a user moves and crosses a border to a different country while carrying out the wireless communication.

According to one embodiment of the present disclosure, a communication apparatus includes a first communication unit configured to carry out first wireless communication by a first wireless communication method, a second communication unit configured to carry out second wireless communication by a second communication method different from the first wireless communication method, a first acquisition unit configured to acquire country information by the second communication unit, and a control unit configured to control the first wireless communication that is being carried out by the first communication unit based on the country information acquired by the acquisition unit while the first wireless communication is being carried out by the first communication unit.

Further features of embodiments of the present disclosure will become apparent from the following description of exemplary embodiments with reference to the attached drawings.

BRIEF DESCRIPTION OF THE DRAWINGS

FIG. 4 is a table illustrating an example of a corresponding relationship between a Mobile Country Code (MCC) and a country name code according to one embodiment.

FIG. 5 is a table illustrating an example of a corresponding relationship between the country name code and a usable frequency channel in wireless local area network (WLAN) communication according to one embodiment.

DESCRIPTION OF THE EMBODIMENTS

In the following description, an exemplary embodiment will be described in detail with reference to the accompanying drawings. The configuration that will be described in the following exemplary embodiment is merely an example, and the scope of embodiments of the present disclosure shall not be limited to the illustrated configuration.

Figure 1:
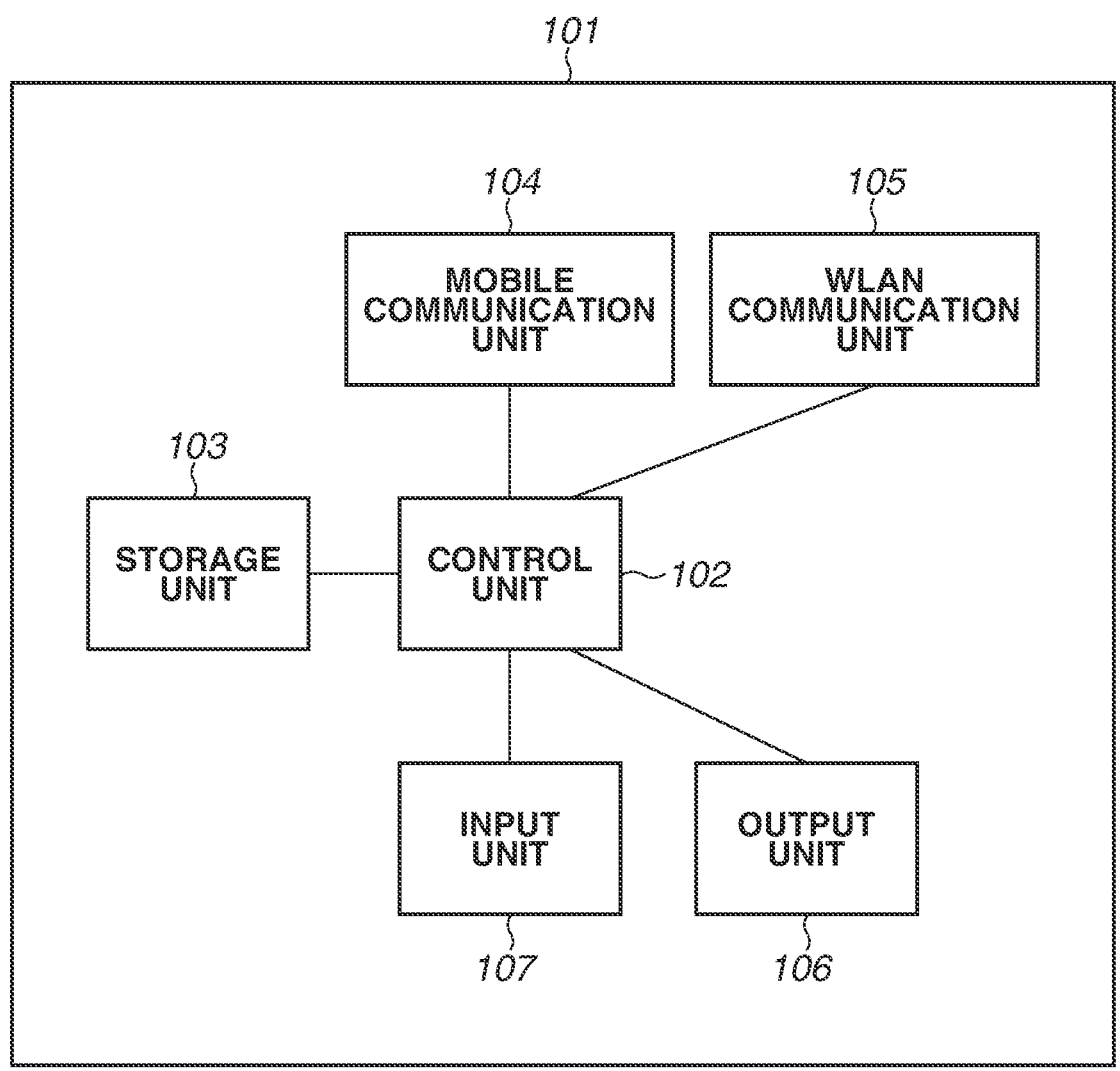
FIG. 1 is a block diagram illustrating a hardware configuration of a communication apparatus according to one embodiment.

FIG. 1 illustrates a hardware configuration of a communication apparatus 101 according to the present exemplary embodiment. The communication apparatus 101 includes a control unit 102, a storage unit 103, a mobile communication unit 104, a wireless local area network (WLAN) communication unit 105, an output unit 106, and an input unit 107.

The control unit 102 includes one or more processors such as a central processing unit (CPU) and a micro processing unit (MPU), and controls the entire communication apparatus 101 by executing a computer program stored in the storage unit 103, which will be described below. The control unit 102 may be formed using an application specific integrated circuit (ASIC), a digital signal processor (DSP), a field programmable gate array (FPGA), and/or the like in addition to or in place of the CPU and the MPU. The control unit 102 may be configured to control the entire communication apparatus 101 based on a cooperation between the computer program stored in the storage unit 103 and an operating system (OS). Further, the control unit 102 generates data and a signal to transmit during communication with another communication apparatus. Further, the control unit 102 may include a plurality of processors such as a multi-core processor, and be configured to control the entire communication apparatus 101 by the plurality of processors.

The storage unit 103 includes one or more memories such as a read only memory (ROM) and a random access memory (RAM), and stores therein a computer program for performing various kinds of operations that will be described below and various kinds of information such as a communication parameter for wireless communication. Examples that may be used as the storage unit 103 include storage media such as a flexible disk, a hard disk, an optical disk, a magneto-optical disk, a compact disk (CD)-ROM, a CD recordable (CD-R), a magnetic tape, a nonvolatile memory card, and a digital versatile disk (DVD), besides the memories such as the ROM and the RAM.

The mobile communication unit 104 controls mobile communication in compliance with the specifications of the Fifth-generation Mobile Communication System (5G) formulated by the Third Generation Partnership Project (3GPP). The mobile communication unit 104 can also control wireless communication via a small cell, which is a base station complying with the specifications of 5G and providing a lower output and a narrower coverage area than a normal base station. Further, the mobile communication unit 104 may control mobile communication in compliance with the specifications of the Fourth-generation Mobile Communication System (4G) and/or the specifications of the 3.9-th Generation Mobile Communication System (Pre-4G), which are generations preceding 5G, in addition to or instead of 5G. Further, the mobile communication unit 104 may control mobile communication in compliance with the specifications of the Third-generation Mobile Communication System (3G) and/or the specifications of Long Term Evolution (LTE) instead of the specifications of 4G and Pre-4G. Further, without being limited thereto, the mobile communication unit 104 may control mobile communication in compliance with the specifications of the next-generation mobile communication system after 5G, such as the Sixth-generation Mobile Communication System (6G). When carrying out the mobile communication in compliance with the specifications of 5G, the communication apparatus 101 can use a frequency band of 6 gigahertz (GHz) or higher in addition to a frequency band of 6 GHz or lower, which has been used in the conventional 4G and Pre-4G communication. More specifically, the communication apparatus 101 can carry out the communication using a frequency band contained in high Super High Frequency (SHF) bands of 6 to 30 GHz (high SHF bands or high microwave bands), and Extremely High Frequency (EHF) bands of 6 to 300 GHz or higher (EHF bands or millimeter-wave bands). The communication using a band of 6 GHz or higher can transmit an extremely large amount of information because radio waves highly tend to travel in straight lines compared to the communication using a band of 6 GHz or lower. However, the communication using a band of 6 GHz or higher leads to a short reachable distance of radio waves compared to the communication using a band of lower than 6 GHz because radio waves are highly affected by the influence of water in the air (for example, rain and mist) and are easily attenuated.

The communication apparatus 101 can acquire country information via the mobile communication from a base station connected via the mobile communication. The communication apparatus 101 may acquire the country information via the mobile communication from a base station not connected but located near the communication apparatus 101 in addition thereto or instead thereof. In this case, the communication apparatus 101 can acquire the country information from a base station located closer to the communication apparatus 101 by acquiring the country information via the 5G communication using a band of 6 GHz or higher with a short reachable distance of radio waves. More specifically, for example, in a case of receiving signals of mobile communication from a plurality of base stations, including the base station to which the communication apparatus 101 is connected, the communication apparatus 101 operates so as to select a base station transmitting a signal of the 5G communication using a band of 6 GHz or higher and preferentially acquire the country information from this base station. Alternatively, in a case of receiving a signal of the 5G communication using a band of 6 GHz or higher from a base station different from the base station to which the communication apparatus 101 is connected, the communication apparatus 101 operates so as to preferentially acquire the country information from this different base station instead of the connected base station. The communication apparatus 101 can acquire more accurate country information by operating so as to preferentially acquire the country information from the base station capable of carrying out the 5G communication using a band of 6 GHz or higher in this manner.

The communication apparatus 101 may acquire the country information via the 5G communication using a band of 6 GHz or lower.

The WLAN communication unit 105 controls WLAN communication in compliance with the Institute of Electrical and Electronics Engineers (IEEE) 802.11 be standard formulated by the IEEE. The WLAN communication unit 105 may control WLAN communication in compliance with at least any one of the IEEE 802.11a/b/g/n/ac/ax standards in addition to or in place of the IEEE 802.11be standard. Further, the WLAN communication unit 105 may control WLAN communication in compliance with a communication standard formulated by the Wireless Fidelity (Wi-Fi) Alliance based on any of the IEEE 802.11 standards in addition to or in place of these standards. The communication standard formulated by the Wi-Fi Alliance means, for example, Wi-Fi Direct, Wi-Fi Aware, and the like.

When carrying out the WLAN communication using the WLAN communication unit 105, the communication apparatus 101 operates as an access point (AP), which constructs the network. The communication apparatus 101 can communicate with another communication apparatus that participates in the network constructed by the communication apparatus 101 via the WLAN communication by operating as the AP. When carrying out the communication in compliance with Wi-Fi Direct as the WLAN communication, the communication apparatus 101 operates as a group owner (GO), which constructs the network. When operating as the AP or the GO, the communication apparatus 101 can determine a frequency channel of the network constructed by the communication apparatus 101. The communication apparatus 101 may operate as a station (STA) or a client (CL) that participates in a network constructed by another communication apparatus in addition to the operation as the AP or the GO, which constructs the network. Further, when operating as the AP or the GO, the communication apparatus 101 transmits a beacon for broadcasting the presence of the network constructed by the communication apparatus 101 to other communication apparatuses. When operating as the AP or the GO, the communication apparatus 101 transmits the beacon using the frequency channel determined by the communication apparatus 101.

When the communication apparatus 101 carries out the WLAN communication in compliance with any of the IEEE 802.11 standards, the use of a specific frequency channel and transmission power may be restricted depending on the country where the communication apparatus 101 is currently located. Therefore, the communication apparatus 101 should appropriately set the frequency channel and the transmission power used in the WLAN communication country by country. For example, channels 1 to 11 are specified as usable frequency channels in the 2.4 GHz band in the United States, while channels 1 to 13 are usable in Japan. Further, for example, a part of frequency channels in the 5 GHz band is unusable in Japan but is usable in the United States. Further, there is also a regulation regarding the upper limit on the transmission power of radio waves in the WLAN communication country by country. The communication apparatus 101 can carry out the communication using the appropriate frequency channel and transmission power by setting the frequency channel and the transmission power according to the country where the communication apparatus 101 is currently located when carrying out the WLAN communication.

The mobile communication unit 104 and the WLAN communication unit 105 each transmit and receive a wireless signal generated by the control unit 102 for the mobile communication or the WLAN communication via an antenna provided on the communication apparatus 101. The communication apparatus 101 may individually include antennas respectively corresponding to the mobile communication and the WLAN communication or may include a single antenna corresponding to both of them. The communication apparatus 101 can communicate a content such as image data, document data, and video data with another communication apparatus via the mobile communication unit 104 or the WLAN communication unit 105.

The output unit 106 presents various kinds of outputs to the user. The input unit 107 receives various kinds of operations from the user. The output by the output unit 106 refers to at least one of, for example, a display on the screen, an audio output by the speaker, and an output of a vibration. The communication apparatus 101 may be configured to implement both the input unit 107 and the output unit 106 as one module, like a touch panel. Further, each of the input unit 107 and the output unit 106 may be integrated with the communication apparatus 101 or may be a different device from the communication apparatus 101.

When carrying out the WLAN communication, the communication apparatus 101 controls the WLAN communication based on the country information received from the base station of the mobile communication via the mobile communication. For example, suppose that the communication apparatus 101 is a camera, and, when the communication apparatus 101 is conducting data communication with a smartphone that is another communication apparatus participating in the constructed network, the user moves to another country while carrying the communication apparatus 101 and the other communication apparatus with him/her. In this case, the communication apparatus 101 automatically acquires the country information from the base station of the mobile communication according to a change in the base station of the mobile communication to which the communication apparatus 101 is connected, and controls the ongoing WLAN communication based on the acquired country information. As a result, even when carrying out the WLAN communication, the communication apparatus 101 can acquire the country information without receiving an instruction from the user and maintain the appropriate WLAN communication, thereby improving the convenience for the user.

In the present exemplary embodiment, the communication apparatus 101 can carry out the mobile communication and the WLAN communication in parallel concurrently. In this case, the communication apparatus 101 may be configured to carry out the mobile communication and the WLAN communication while switching them in the time-sharing manner.

Further, the communication apparatus 101 has been described as a communication apparatus capable of carrying out the mobile communication and the WLAN communication, but may be able to carry out short-range wireless communication and/or wireless personal area network (WPAN) (wireless PAN) communication in addition to them. The short-range wireless communication refers to, for example, the Near Field Communication (NFC) communication or the Radio Frequency Identification (RFID) communication. Further, the WPAN communication refers to, for example, the Bluetooth® communication or the ZigBee communication.

In the present exemplary embodiment, the communication apparatus 101 is a camera. However, without being limited thereto, the communication apparatus 101 may be a wireless LAN router, a personal computer (PC), a smartphone, a tablet, a mobile phone, or the like.

Figure 2:
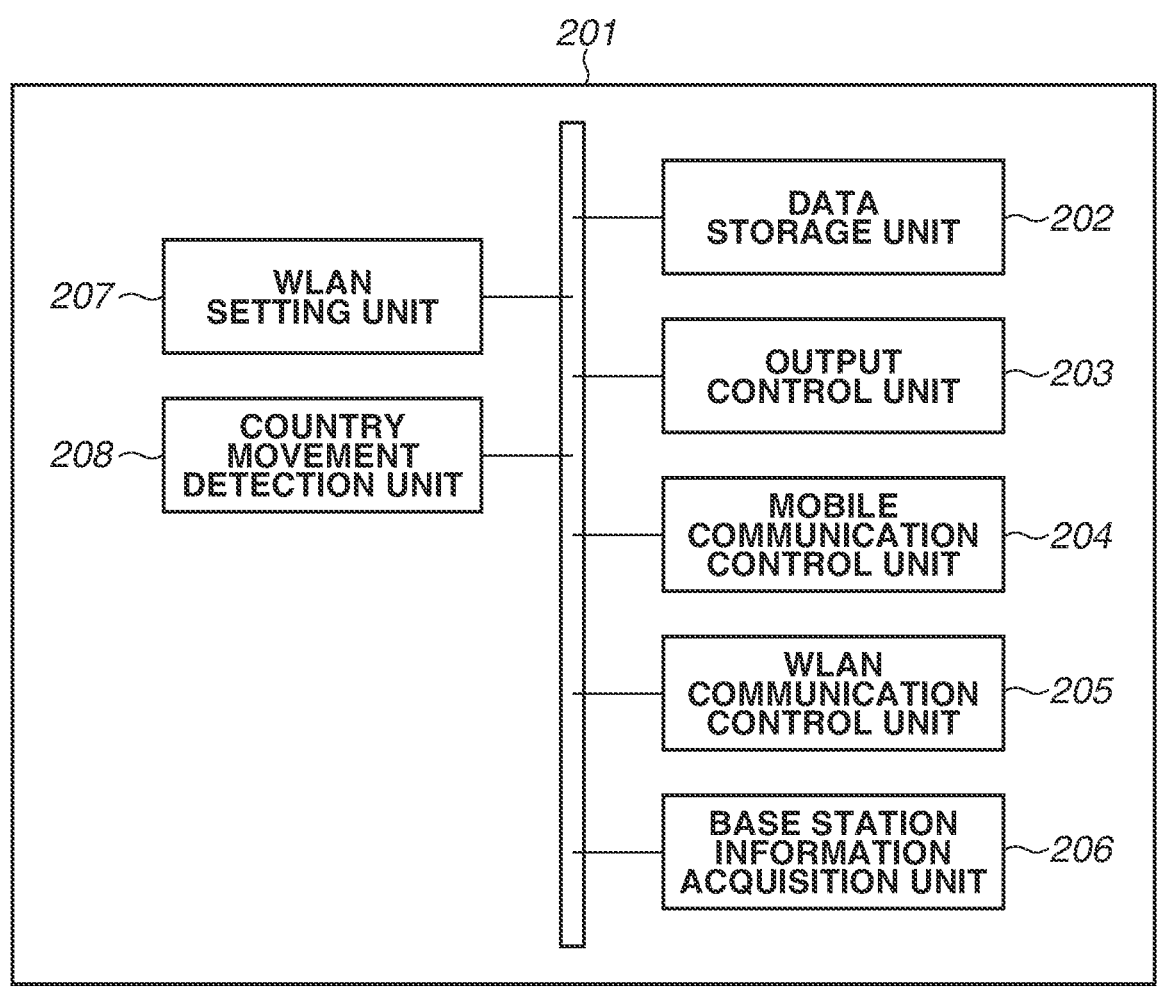
FIG. 2 is a software functional block diagram of the communication apparatus according to one embodiment.

FIG. 2 illustrates a software functional block diagram of the communication apparatus 101. The software functional blocks of the communication apparatus 101 include a data storage unit 202, an output control unit 203, a mobile communication control unit 204, a WLAN communication control unit 205, a base station information acquisition unit 206, a WLAN setting unit 207, and a country movement detection unit 208.

The data storage unit 202 holds therein software held by the communication apparatus 101, and information such as authentication information and a communication parameter in the WLAN communication and the mobile communication. Further, the data storage unit 202 stores therein the country information acquired by the base station information acquisition unit 206, which will be described below. Further, the data storage unit 202 stores therein the corresponding relationship between the country information acquired by the communication apparatus 101 and a country name code. Further, the data storage unit 202 also stores therein the corresponding relationship between the country name code, and the frequency channel and the upper limit value on the transmission power in the WLAN communication that are usable in the country indicated by the country name code.

The output control unit 203 controls the output unit 106. The mobile communication control unit 204 controls the mobile communication unit 104. The WLAN communication control unit 205 controls the WLAN communication unit 105.

The base station information acquisition unit 206 acquires information regarding the mobile communication from the base station of the mobile communication by controlling the mobile communication unit 104. More specifically, the base station information acquisition unit 206 acquires the country information from the base station of the mobile communication.

The WLAN setting unit 207 sets the frequency channel of the WLAN communication that is used by the WLAN communication unit 105. The WLAN setting unit 207 sets the frequency channel that is used by the WLAN communication unit 105 based on the acquired country information. A change in the WLAN frequency band, which will be described below, is made by the WLAN setting unit 207.

The country movement detection unit 208 performs processing for detecting a movement to another country, which will be described below with reference to FIG. 3.

Figure 3:
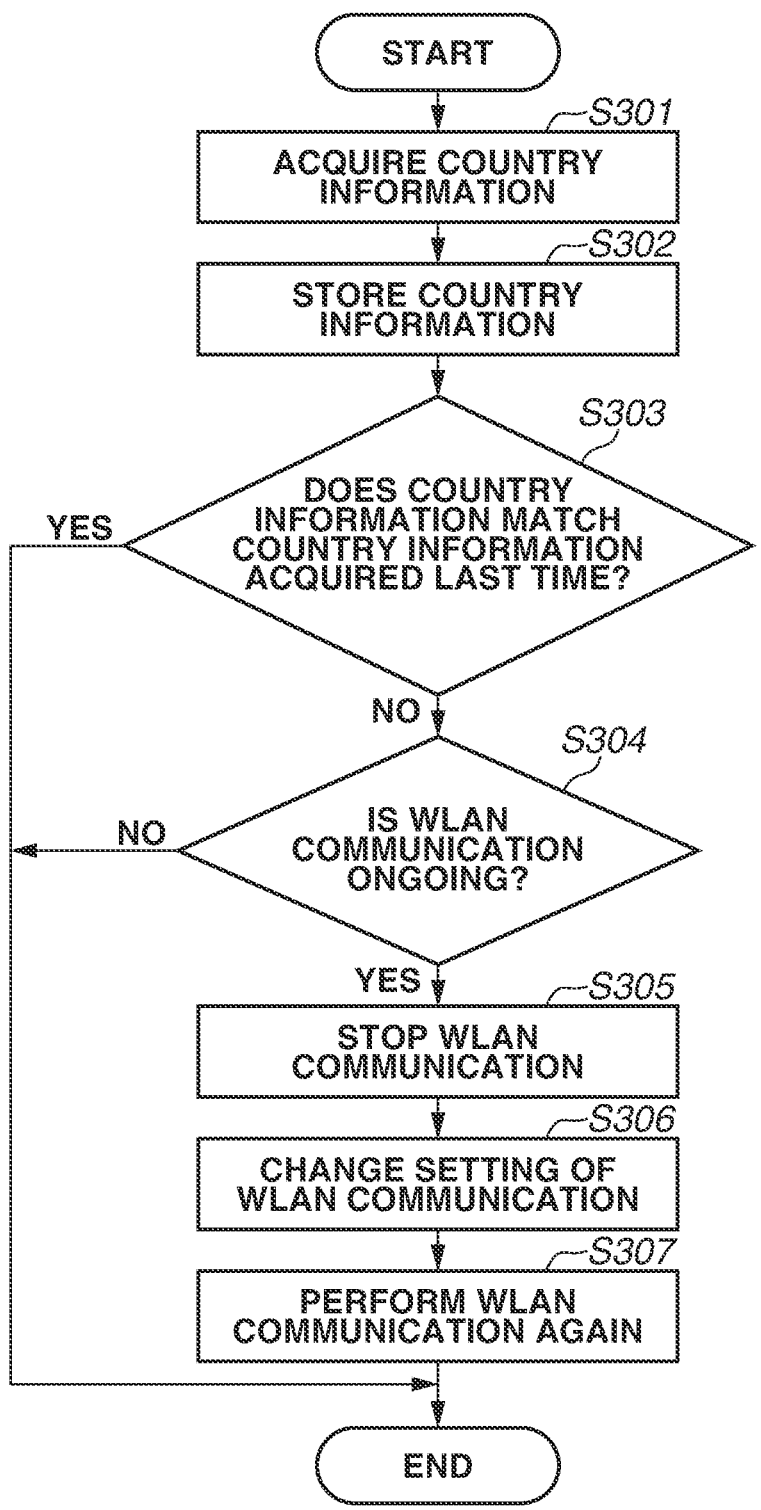
FIG. 3 is a flowchart illustrating detection processing performed when the communication apparatus detects a movement of the communication apparatus to another country according to one embodiment.

FIG. 3 is a flowchart illustrating detection processing realized by reading out the computer program stored in the storage unit 103 into the control unit 102 and executing this computer program when the communication apparatus 101 detects the movement to another country.

The flowchart illustrated in FIG. 3 is started when the communication apparatus 101 is carrying out the mobile communication and the connected base station of the mobile communication is changed. Alternatively, the communication apparatus 101 may start the processing of this flow per predetermined time when carrying out the mobile communication. Alternatively, the communication apparatus 101 may start the processing of this flow based on reception of an instruction to acquire the country information from the user when carrying out the mobile communication.

Alternatively, the communication apparatus 101 may start the processing of this flow when a change has occurred in a subscriber identifier (an International Mobile Subscriber Identity (IMSI)) to be used when carrying out the mobile communication. The IMSI is a number issued when the user of the communication apparatus 101 subscribes to a mobile phone carrier, and a unique identification number assigned for each user. The IMSI is stored in a Subscriber Identity Module (SIM) card of the communication apparatus 101. The IMSI is issued for each subscription to the mobile phone carrier, which means that, for example, the communication apparatus 101 holds a plurality of IMSIs if the user of the communication apparatus 101 has a plurality of subscriptions. Therefore, if the communication apparatus 101 moves to another country and has a subscription to a mobile phone carrier usable in the country after the movement, the communication apparatus 101 changes the IMSI to be used in the mobile communication to the IMSI corresponding to the mobile phone carrier after the movement. In other words, when the IMSI is changed, the movement of the communication apparatus 101 to another country is deduced based thereon. The communication apparatus 101 can reduce the frequency of the execution of the present flow and improve power saving compared to starting the processing of this flow when the base station of the mobile communication is changed.

Further, the processing of the present flow may be started when the connection type of the mobile communication of the communication apparatus 101 is changed from the connection with the telecommunications carrier to which the communication apparatus 101 subscribes to a roaming connection. The roaming connection refers to a connection type in which, outside the service area of the telecommunications carriers to which the communication apparatus 101 subscribes, a connection is established using a facility of a carrier with which this telecommunications carrier has a partnership with. As a result, the communication apparatus 101 can reduce the frequency of the execution of the present flow and improve power saving compared to starting the processing of this flow when the base station of the mobile communication is changed. After the connection type of the mobile communication is changed to the roaming connection and the processing of the present flow is performed, a change in the base station of the mobile communication may be set as the trigger for the start of the present flow. This setting allows the present flow to be performed even while the roaming connection is ongoing. Alternatively, the communication apparatus 101 may start the processing of the present flow when the carrier supporting the roaming connection is changed while the roaming connection is ongoing. For example, the processing of the present flow may be started when the connection type is changed to the roaming connection using a German carrier while the roaming connection is ongoing using a French carrier.

In step S301, the communication apparatus 101 acquires the country information from a signal called broadcast information transmitted from the currently connected base station of the mobile communication. More specifically, the communication apparatus 101 acquires a two-digit or three-digit number called a Mobile Country Code (MCC) as the country information from a Public Land Mobile Network (PLMN) contained in the broadcast information transmitted from the base station. PLMN contains a Mobile Network Code (MNC) indicating the mobile phone carrier in addition to the MCC. The first digit in the MCC indicates a region, and, for example, the MCC having 4 as the first digit therein indicates that the region is Asia or Middle East. The communication apparatus 101 can identify the country from the acquired MCC by holding, in advance, a table indicating the corresponding relationship between the MCC and the country name code like the example illustrated in FIG. 4. The corresponding relationship between the MCC and the country name code is not limited to the example illustrated in FIG. 4. Further, the base station of the mobile communication regularly transmits the broadcast information containing the MCC per predetermined time.

In step S302, the communication apparatus 101 stores the country information acquired in step S301 into the storage unit 103. The communication apparatus 101 may store the MCC as the country information or may store the country name code identified from the MCC. Here, the communication apparatus 101 stores the country information acquired last time in the storage unit 103. This means that, for example, the storage unit 103 stores therein the country information of the base station to which the communication apparatus 101 has been connected last time and the country information of the base station to which the communication apparatus 101 is newly connected, in the case where the processing of the present flow is started according to the change in the base station of the mobile communication to which the communication apparatus 101 is connected.

In step S303, the communication apparatus 101 determines whether the country information acquired in step S301 and the country information acquired last time that is stored in the storage unit 103 match each other. More specifically, the communication apparatus 101 compares the country name codes identified based on the MCC acquired in step S301 and the MCC acquired last time, respectively, using the table illustrated in FIG. 4, and determines whether they match each other. If the country name codes are different, this means that the communication apparatus 101 has moved to another country. If the country name codes match each other, because the communication apparatus 101 has not moved to another country, the communication apparatus 101 determines YES in step S303 (YES in step S303) and ends the processing of the present flow. On the other hand, if the country name codes do not match each other, because the communication apparatus 101 has moved to another country, the communication apparatus 101 determines NO in step S303 (NO in step S303) and performs the processing of step S304.

In step S304, the communication apparatus 101 determines whether the communication apparatus 101 is carrying out the WLAN communication. If the communication apparatus 101 is communicating with another communication apparatus or a base station of the WLAN communication via the WLAN communication unit 105, the communication apparatus 101 determines YES in the present step (YES in step S304). Further, even when the communication apparatus 101 is not communicating with another communication apparatus or a base station via the WLAN communication unit 105, the communication apparatus 101 determines YES in the present step (YES in step S304) if being in a state capable of outputting a signal of the WLAN communication. The communication apparatus 101 in the state capable of outputting a signal of the WLAN communication means a state that electric power is supplied to the WLAN communication unit 105 of the communication apparatus 101. Alternatively, the communication apparatus 101 in the state capable of outputting a signal of the WLAN communication means a state that electric power is supplied to the WLAN communication unit 105 and the communication apparatus 101 also transmits a response to a signal received from another communication apparatus. Alternatively, the communication apparatus 101 in the state capable of outputting a signal of the WLAN communication means a state that electric power is supplied to the WLAN communication unit 105 and the communication apparatus 101 also initiatively transmits a signal of the WLAN communication. The initiative transmission of a signal of the WLAN communication by the communication apparatus 101 is, for example, transmission of a beacon by the communication apparatus 101. On the other hand, if being in a state not communicating with another communication apparatus or a base station via the WLAN communication unit 105 and also subjected to a restriction on an output of a signal of the WLAN communication, the communication apparatus 101 determines NO in the present step (NO in step S304). The communication apparatus 101 in the state subjected to the restriction on an output of a signal of the WLAN communication means a state that no electric power is supplied to the WLAN communication unit 105 of the communication apparatus 101. Alternatively, the communication apparatus 101 in the state subjected to the restriction on an output of a signal of the WLAN communication means a state that the communication apparatus 101 does not initiatively transmit a signal of the WLAN communication. Alternatively, the communication apparatus 101 in the state subjected to the restriction on an output of a signal of the WLAN communication means a state that the communication apparatus 101 does not transmit a response to a signal received from another communication apparatus. If the communication apparatus 101 is not carrying out the WLAN communication, the communication apparatus 101 determines NO in step S304 (NO in step S304) and ends the processing of the present flow. If the communication apparatus 101 is carrying out the WLAN communication, the communication apparatus 101 determines YES in step S304 (YES in step S304) and performs the processing of step S305.

In step S305, the communication apparatus 101 stops the ongoing WLAN communication. More specifically, the communication apparatus 101 transitions from the state capable of outputting a signal of the WLAN communication to the state subjected to the restriction on an output.

In step S306, the communication apparatus 101 changes the setting of the WLAN communication after stopping the WLAN communication. In the present step, the communication apparatus 101 changes the setting of the WLAN frequency band by the WLAN setting unit 207. The communication apparatus 101 holds, in advance, the corresponding relationship between the country name code and the usable frequency channel in the WLAN communication like the example illustrated in FIG. 5. The communication apparatus 101 sets the usable frequency channel in the WLAN communication that corresponds to the country name code identified based on the MCC acquired in step S301 as the frequency channel to be used in the WLAN communication, using the table illustrated in FIG. 5. For example, if the country name code corresponding to the MCC acquired in step 301 is US, the communication apparatus 101 sets W52, W53, and W56 as the frequency channel to be used in the WLAN communication in the present step. The table illustrated in FIG. 5 indicates the corresponding relationship between the country name code and the usable frequency channel in the 5 GHz band, but may indicate the corresponding relationship between the country name code and the usable frequency channel in the 2.4 GHz band instead thereof or in addition thereto. Further, the table may indicate the corresponding relationship between the country name code and the upper limit value on the transmission power instead of or in addition to the frequency channel. The communication apparatus 101 can carry out the appropriate WLAN communication in the country after the movement by setting the frequency channel and the upper limit value on the transmission power corresponding to the acquired country name code as the frequency channel and the upper limit value on the transmission power to be used in the WLAN communication. The communication apparatus 101 can achieve the intended function by changing at least one of the settings of the frequency channel of the WLAN communication and the upper limit value on the transmission power in the present step.

In step S307, the communication apparatus 101 carries out the WLAN communication again after performing the processing of step S306. In this case, the frequency channel and the upper limit value on the transmission power that the communication apparatus 101 uses in the restarted WLAN communication are the frequency channel and the upper limit value on the transmission power set in step S306. The communication apparatus 101 constructs a network using the frequency channel set in step S306 and transmits a signal of the WLAN communication while avoiding exceedance of the upper limit value on the transmission power set in step S306. After performing the processing of step S307, the communication apparatus 101 ends the processing of this flow.

In this manner, as illustrated in FIG. 3, even when the WLAN communication is being carried out by the communication apparatus 101, the communication apparatus 101 acquires the country information without receiving an instruction from the user and performs control so as to carry out the WLAN communication according to the appropriate frequency channel and transmission power based on the acquired country information. As a result, the convenience for the user can be improved.

The communication apparatus 101 has been described as performing the processing of step S305 after determining YES in step S304 in the present exemplary embodiment, but is not limited thereto and may be configured to compare whether the frequency channels respectively corresponding to the previous country information and the acquired country information match each other. The communication apparatus 101 may refrain from stopping the WLAN communication and end the processing of the present flow if the frequency channels usable in the countries identified based on the respective pieces of country information match each other. On the other hand, the communication apparatus 101 performs the processing in and after step S305 if the frequency channels usable in the countries identified based on the respective pieces of country information do not match each other. Further, the communication apparatus 101 may be configured to also make a similar determination with respect to the upper limit value on the transmission power in addition to or instead of the frequency channel. As a result, even when the communication apparatus 101 has moved to another country, the communication apparatus 101 can continue the WLAN communication without stopping the WLAN communication if the usable frequency channel and the upper limit value on the transmission power are the same between the country before the movement and the country after the movement.

Further, without being limited thereto, the communication apparatus 101 may be configured to determine whether the frequency channel of the WLAN communication currently in use is contained in the frequency channels corresponding to the country information acquired in step S301 after determining YES in step S304. The communication apparatus 101 may end the processing of the present flow if the frequency channel in use is contained in the frequency channels corresponding to the acquired country information. On the other hand, the communication apparatus 101 performs the processing in and after step S305 if the frequency channel in use is not contained in the frequency channels corresponding to the acquired country information. In this way, the communication apparatus 101 can achieve power saving by not unnecessarily changing the setting if the frequency channel currently in use is also usable in the country after the movement. Further, the communication apparatus 101 can avoid an unnecessary disconnection of the WLAN communication and improve the convenience for the user by continuing the WLAN communication without stopping it if the frequency channel currently in use is also usable in the country after the movement.

Further, the communication apparatus 101 has been described as changing the setting of the WLAN communication based on the acquired country information after stopping the WLAN communication in step S305 in the present exemplary embodiment, but is not limited thereto and may change the setting without stopping the WLAN communication. More specifically, the communication apparatus 101 may skip step S305 illustrated in FIG. 3 and perform the processing of step S306. In this case, the communication apparatus 101 can achieve the intended function by carrying out the WLAN communication based on the setting of the WLAN communication changed in step S306 instead of carrying out the WLAN communication again in step S307.

Further, the communication apparatus 101 has been described as determining whether the country information acquired this time and the country information acquired last time match each other in step S303 in the present exemplary embodiment, but is not limited thereto and may be configured to compare the country information acquired this time with the country information corresponding to the setting of the WLAN communication currently set to the communication apparatus 101. More specifically, the communication apparatus 101 may hold, in advance, the country information corresponding to the setting of the WLAN communication (the frequency channel and the transmission power) currently set to the communication apparatus 101 in the storage unit 103, without being limited to using the country information acquired last time. Alternatively, in step S303, the communication apparatus 101 may compare the country information acquired this time and the country information used as the setting of the current WLAN communication to determine whether they match each other.

Figure 6:
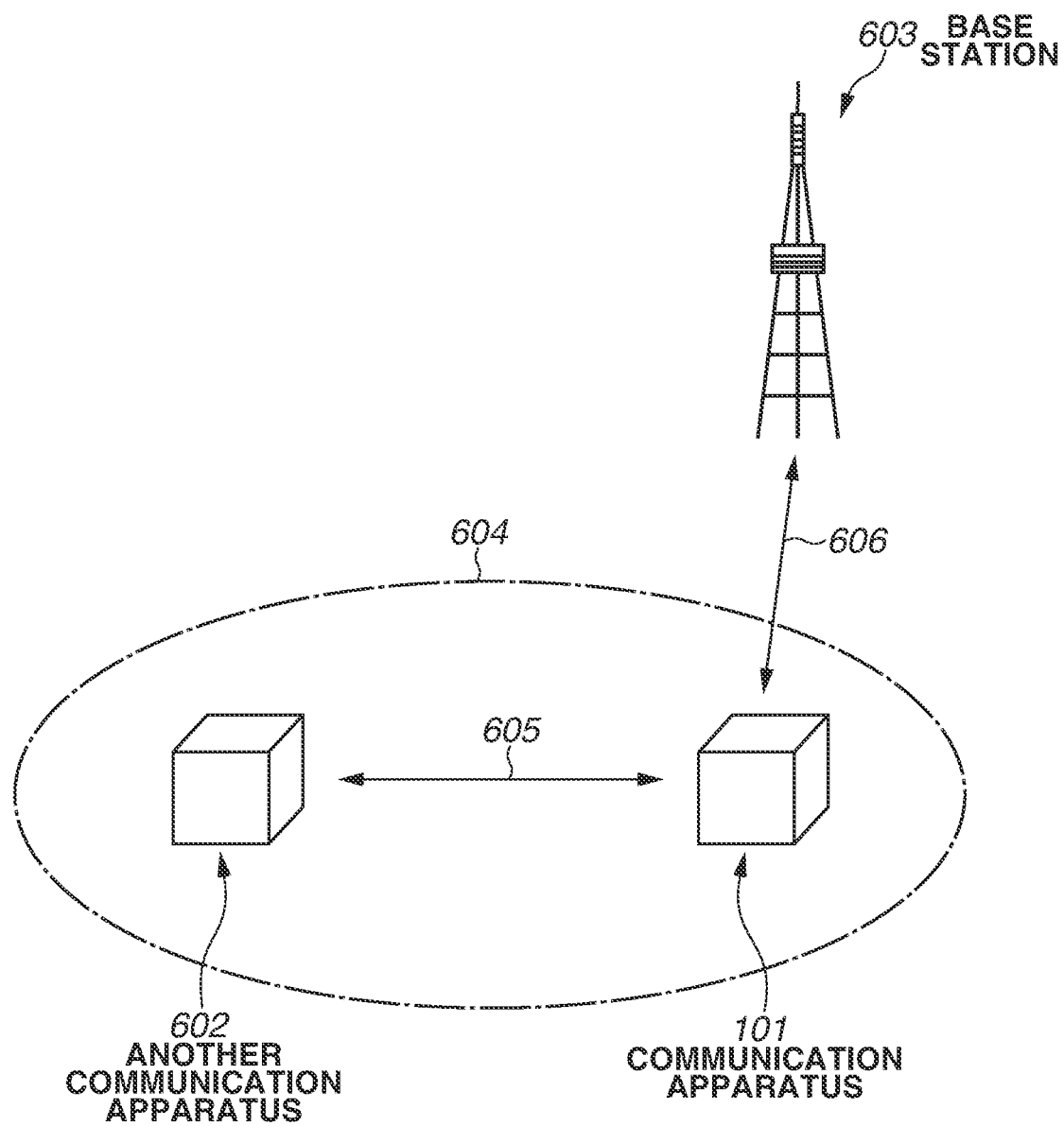
FIG. 6 is a diagram illustrating a configuration of a wireless network in which the communication apparatus performs wireless communication according to one embodiment.

FIG. 6 illustrates the network configuration of the network that the communication apparatus 101 participates in. The communication apparatus 101 constructs a network 604 as the AP. The communication apparatus 101 can communicate with another communication apparatus 602 participating in the constructed network 604 via WLAN communication 605. Further, the communication apparatus 101 can acquire the country information via mobile communication 606 from a base station 603 of the mobile communication. The communication apparatus 101 can control the frequency channel to be used in the network 604 based on the country information acquired via the mobile communication 606. In addition thereto or instead thereof, the communication apparatus 101 can set the upper limit value on the transmission power for a signal to transmit to the other communication apparatus 602 via the WLAN communication 605 based on the acquired country information.

Further, the communication apparatus 101 has been described as acquiring the country information via the mobile communication when carrying out the WLAN communication in the present exemplary embodiment, but may acquire the country information via the Global Positioning System (GPS) instead thereof. Alternatively, when carrying out the WPAN communication, the communication apparatus 101 may control the WPAN communication based on the country information acquired via at least any one of the mobile communication, the WLAN communication, and the GPS.

In a case of using the GPS, the communication apparatus 101 can calculate a distance between each satellite and the communication apparatus 101 by acquiring orbital information from four or more satellites and time information of an atomic clock. The communication apparatus 101 acquires the positional information of the communication apparatus 101 based on the calculated distance to each of the satellites. The communication apparatus 101 should inquire of a server in which the positional information and the country information are associated with each other to identify the country where the communication apparatus 101 is currently located from the positional information. The communication apparatus 101 can acquire the country information by inquiring of this server. Therefore, the communication apparatus 101 should inquire of the server via other communication such as the WLAN communication.

Ina case of using the WLAN communication, the communication apparatus 101 should access a server holding therein a positional information database in which identification information (a media access control (MAC) address) of an AP of the WLAN communication and positional information are associated with each other. The communication apparatus 101 can acquire the positional information to acquire the corresponding country information by accessing the server holding therein the positional information database based on the identification information of the AP which the communication apparatus 101 is connected to or can receive radio waves from.

In this manner, the communication apparatus 101 can acquire the country information using the GPS or the WLAN communication instead of using the mobile communication. However, when acquiring the country information via the mobile communication, the communication apparatus 101 or another apparatus can fulfill the purpose by being able to receive the broadcast information transmitted from the base station of the mobile communication, and can easily acquire the country information because communication with a server is not necessary compared to the GPS and the WLAN communication. In other words, when acquiring the country information via the mobile communication, the communication apparatus 101 can acquire the country information even when being unable to connect to a server and can also acquire the country information even when being unable to carry out communication different from the mobile communication.

In a case of acquiring the country information via the WLAN communication, the communication apparatus 101 acquires the country information using a frequency channel permitted to be used worldwide. For example, the communication apparatus 101 acquires the country information using channel 1 in the 2.4 GHz band. In this case, the communication apparatus 101 may be configured to set whether to use such a frequency channel that the permission for the use thereof differs from one country to another based on the country information acquired using the frequency channel permitted to be used worldwide. For example, the communication apparatus 101 may set the frequency channel to be used in the 5 GHz band based on the country information acquired using channel 1 in the 2.4 GHz band.

The communication apparatus 101 may determine whether a partner apparatus from which the country information is acquired is present near the communication apparatus 101 when acquiring the country information via communication different from the mobile communication. More specifically, the communication apparatus 101 determines whether the reception strength (received signal strength indication (RSSI)) of a wireless signal received from the partner apparatus is greater than or equal to a predetermined threshold value. If the RSSI received from the partner apparatus is greater than or equal to the predetermined threshold value, the communication apparatus 101 acquires the country information from this partner apparatus, determining that the partner apparatus is present near the communication apparatus 101. On the other hand, if the RSSI received from the partner apparatus is less than the predetermined threshold value, the communication apparatus 101 does not acquire the country information from this partner apparatus, determining that the partner apparatus is not present near the communication apparatus 101. In this manner, the communication apparatus 101 can be configured to be able to acquire more accurate country information by acquiring the country information from the other apparatus present near the communication apparatus 101.

At least a part or all of the flowchart of the communication apparatus 101 illustrated in FIG. 3 may be implemented by hardware. In the case where the flowchart is implemented by hardware, this can be achieved by, for example, generating a dedicated circuit on an FPGA from a computer program for implementing each step using a predetermined compiler, and utilizing it. Further, the present exemplary embodiment may be configured in such a manner that this flowchart is implemented as hardware by forming a gate array circuit in a similar manner to the FPGA. Further, the present exemplary embodiment may be configured in such a manner that this flowchart is realized by an ASIC.

The exemplary embodiment which has been described in detail can also be embodied as, for example, a system, an apparatus, a method, a program, or a recording medium (a storage medium). More specifically, various embodiments of the present disclosure may be applied to a system including a plurality of devices (for example, a host computer, an interface device, an imaging device, a web application, and the like), or may also be applied to an apparatus including one device.

Various embodiments of the present disclosure can also be realized by processing that supplies a program capable of achieving one or more functions of the above-described exemplary embodiment to a system or an apparatus via a network or a storage medium, and causes one or more processors in a computer of this system or apparatus to read out and execute the program. Further, various embodiments of the present disclosure can also be realized by a circuit (for example, an ASIC) capable of realizing one or more functions.

According to various embodiments of the present disclosure, it becomes possible to, when a user moves to a different country while carrying out the wireless communication, improve the convenience for the user by appropriately controlling this wireless communication.

Other Embodiments

Embodiment(s) of various embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-152996, filed Aug. 23, 2019, which is hereby incorporated by reference herein in its entirety.

What is claimed is:

1. A communication apparatus having
a first wireless communication function of carrying out first wireless communication by a first wireless communication method conforming to an Institute of Electrical and Electronics Engineers (IEEE) 802.11 series and a second wireless communication function of carrying out second wireless communication by a second communication method in compliance with the Fifth-generation Mobile Communication System (5G) formulated by the Third Generation Partnership Project (3GPP), and
the communication apparatus comprising:
at least one memory that stores a set of instructions; and at least one processor that executes the instructions, the instructions, when executed, causing the communication apparatus to perform operations comprising:

obtaining, by the second communication method, country information identifying a country from a base station that performs the 5G communication using a band of 6 gigahertz (GHz) or higher, wherein the country information identifying the country in which the base station performing the 5G communication using the band of 6 GHz or higher is located, determining, based on the obtained country information, whether a country in which the communication apparatus is located has changed to a different country or not, determining, in a case where the country in which the communication apparatus is located is determined to have changed, whether a wireless channel that is in use in the first wireless communication by the first wireless communication method and an upper limit on transmission power are compliant with a communication regulation of the different country or not, performing control for continuing the first wireless communication using the first wireless communication function in a case where the wireless channel and the upper limit are determined to be compliant with the communication regulation of the different country and for disabling the first wireless communication function in a case where the wireless channel and the upper limit are determined to be not compliant with the communication regulation of the different country, changing, after disabling the first wireless communication function, a useable channel and/or the upper limit on the transmission power, for compliance with the communication regulation of the different country, and enabling the first wireless communication function after completion of the changing, wherein country information obtained from a base station that performs the 5G communication using a band lower than 6 GHz is not used for the determining of whether the country in which the communication apparatus is located has changed.

2. The communication apparatus according to claim 1, wherein the operations further comprise:

specifying the country information by using a Mobile Country Code (MCC) which is acquired from the base station that performs the 5G communication using the band of 6 GHz or higher, via the second wireless communication.

3. The communication apparatus according to claim 2, wherein the at least one memory holds a table indicating a correspondence between the MCC and a country name code, wherein, in the specifying, the country name code is specified as the country information, and the country name code is specified based on the MCC acquired from the base station and the held table.

4. The communication apparatus according to claim 1, wherein the communication apparatus operates as an access point that constructs a network for wireless communication in compliance with the IEEE 802.11 series standards.

5. A method for controlling a communication apparatus having a first wireless communication function of carrying out, at a first communication interface, first wireless communication by a first wireless communication method conforming to an Institute of Electrical and Electronics Engineers (IEEE) 802.11 series; and a second wireless communication function of carrying out, at a second communication interface, second wireless communication by a second communication method in compliance with the Fifth-generation Mobile Communication System (5G) formulated by the Third Generation Partnership Project (3GPP), and the method comprising:

obtaining, by the second communication method, country information identifying a country from a base station that performs the 5G communication using a band of 6 gigahertz (GHz) or higher, wherein the country information identifying the country in which the base station performing the 5G communication using the band of 6 GHz or higher is located, determining, based on the obtained country information, whether a country in which the communication apparatus is located has changed to a different country or not, determining, in a case where the country in which the communication apparatus is located is determined to have changed, whether a wireless channel that is in use in the first wireless communication by the first wireless communication method and an upper limit on transmission power are compliant with a communication regulation of the different country or not, performing control for continuing the first wireless communication using the first wireless communication function in a case where the wireless channel and the upper limit are determined to be compliant with the communication regulation of the different country and for disabling the first wireless communication function in a case where the wireless channel and the upper limit are determined to be not compliant with the communication regulation of the different country, changing, after disabling the first wireless communication function, a useable channel and/or the upper limit on the transmission power, for compliance with the communication regulation of the different country, and enabling the first wireless communication function after completion of the changing, wherein country information obtained from a base station that performs the 5G communication using a band lower than 6 GHz is not used for the determining of whether the country in which the communication apparatus is located has changed.

6. A non-transitory computer-readable storage medium storing a computer program for causing a computer to execute a control method of a communication apparatus, the communication apparatus having:

a first wireless communication function of carrying out, at a first communication interface, first wireless communication by a first wireless communication method conforming to an Institute of Electrical and Electronics Engineers (IEEE) 802.11 series; and a second wireless communication function of carrying out, at a second communication interface, second wireless communication by a second communication method in compliance with the Fifth-generation Mobile Communication System (5G) formulated by the Third Generation Partnership Project (3GPP), and the control method comprising:

obtaining, by the second communication method, country information identifying a country from a base station that performs the 5G communication using a band of 6 gigahertz (GHz) or higher, wherein the country information identifying the country in which the base station performing the 5G communication using the band of 6 GHz or higher is located, determining, based on the obtained country information, whether a country in which the communication apparatus is located has changed to a different country or not, determining, in a case where the country in which the communication apparatus is located is determined to have changed, whether a wireless channel that is in use in the first wireless communication by the first wireless communication method and an upper limit on transmission power are compliant with a communication regulation of the different country or not, performing control for continuing the first wireless communication using the first wireless communication function in a case where the wireless channel and the upper limit are determined to be compliant with the communication regulation of the different country and for disabling the first wireless communication function in a case where the wireless channel and the upper limit are determined to be not compliant with the communication regulation of the different country, changing, after disabling the first wireless communication function, a useable channel and/or the upper limit on the transmission power, for compliance with the communication regulation of the different country, and enabling the first wireless communication function after completion of the changing, wherein country information obtained from a base station that performs the 5G communication using a band lower than 6 GHz is not used for the determining of whether the country in which the communication apparatus is located has changed.

7. The communication apparatus according to claim 1, wherein the communication apparatus is a camera.

\* \* \* \* \*